United States Patent
Park

[11] Patent Number: 5,764,302
[45] Date of Patent: Jun. 9, 1998

[54] AUTOMATIC PICTURE-ADJUSTING APPARATUS OF VIDEO APPLIANCE AND METHOD THEREOF

[75] Inventor: Kwang Ho Park, Kyoungsangbuk-Do, Rep. of Korea

[73] Assignee: Intelpros, Seoul, Rep. of Korea

[21] Appl. No.: 712,169

[22] Filed: Sep. 11, 1996

[30] Foreign Application Priority Data

Sep. 18, 1995 [KR] Rep. of Korea ............... P95-30436

[51] Int. Cl.⁶ ............................................. H03L 7/00
[52] U.S. Cl. .................... 348/542; 348/543; 348/510; 348/556; 315/364
[58] Field of Search .......................... 348/510, 540, 348/541, 542, 543, 555, 556, 581, 445; 315/364, 367; H04N 5/08; H03L 7/00

[56] References Cited

U.S. PATENT DOCUMENTS

| | | | |
|---|---|---|---|
| 4,536,794 | 8/1985 | Fernsler et al. | 348/542 |
| 4,547,708 | 10/1985 | Hafert | 315/371 |
| 4,581,563 | 4/1986 | Rockrohr | 315/388 |
| 4,874,992 | 10/1989 | Benson et al. | 315/387 |
| 5,142,204 | 8/1992 | Gornati et al. | 315/364 |
| 5,329,211 | 7/1994 | Sasaki et al. | 315/371 |
| 5,614,956 | 3/1997 | Matsuura | 348/556 |

FOREIGN PATENT DOCUMENTS

| | | | |
|---|---|---|---|
| 2269080 | 8/1993 | European Pat. Off. | H04N 3/27 |
| 269080 | 7/1992 | United Kingdom | H04N 3/223 |

*Primary Examiner*—Michael H. Lee
*Attorney, Agent, or Firm*—Oppenheimer Wolff & Donnelly LLP

[57] ABSTRACT

Apparatus and method for automatically adjusting a picture size of a video appliance such as a monitor. According to the apparatus and method, since electrical characteristic data of the video appliance employing the apparatus of the present invention is preset therein, regardless of input of any external data, a user's one time input or automatic picture-adjusting mode selection makes external input data and preset characteristic data be compared, and the horizontal and vertical picture size of the video appliance in the video appliance is automatically adjusted. Therefore, the adjusting step is simplified in the manufacturing process of monitor, promoting productivity, and decreasing the cost thereof.

5 Claims, 3 Drawing Sheets

AUTOMATIC PICTURE-ADJUSTING APPARATUS OF VIDEO APPLIANCE AND METHOD THEREOF

BACKGROUND OF THE INVENTION

1. Field of the Invention

The present invention relates to an automatic picture adjustment of a video appliance, more particularly to an automatic picture-adjusting apparatus of a video appliance in which a picture can be always displayed in uniform size by being adjusted in the video appliance regardless of the introduction of any external components, and method thereof.

2. Description of Prior Art

Generally, in the manufacturing process of a video appliance such as a multi-sync monitor, one step for automatic picture-adjusting mode is performed.

The conventional method for automatically adjusting the picture of a video appliance is shown in FIG. 1. After the automatic adjustment of picture size is started at step A, the horizontal and vertical picture size of the multi-sink monitor is adjusted at steps B and C and then pin cushion and trapezoidal distortion thereof are corrected at steps D and E. At steps F and G, the horizontal and vertical positions of the picture are adjusted. That is, conditions for automatic picture-adjusting mode, which will be selected by user, are preset in the video appliance such as a multi-sync monitor during production at the factory.

In the above method, however, when the external input mode not adjusted during the manufacturing process is established or the user enters an incorrect input mode, the preadjusted picture operates abnormally. The result is that the picture condition is so unstable that viewing is impossible. Furthermore, under such condition, the monitor picture may disappear.

Also, it is difficult, if possible, to return the monitor picture to the normal operation state. In addition, there are other problems such as the lower productivity and the higher costs caused by the adjustment of individual multi-sync monitor picture during the manufacturing process.

SUMMARY OF THE INVENTION

An object of the present invention is to provide an apparatus for automatically adjusting the picture of a video appliance in which a picture can be always displayed in a uniform size if the user inputs once or selects a mode for automatically adjusting the picture even though external data are entered thereto, by presetting electrical characteristic data of the video appliance in a microcomputer installed in the video appliance, and method thereof.

Another object of the present invention is to provide an apparatus for automatically adjusting the picture of a video appliance in which the adjusting step performed during the manufacturing process of video appliance can be simplified to promote productivity and to decrease costs, and method thereof. According to an aspect of the present invention, there is provided an apparatus for automatically adjusting the picture size of a video appliance comprising:

a microcomputer receiving a user's manual input signal and a horizontal frequency and a vertical frequency to output a first data and a second data representing a horizontal picture size and a vertical picture size, respectively, the ratio of the first data to the second data being constant;

an analog/digital converter for digitizing deflection voltage determining the horizontal picture size and for outputting a third data representing a measured horizontal picture size to the microcomputer;

a horizontal picture size controller, coupled between the microcomputer and the analog/digital converter, for receiving the first data and controlling the horizontal picture size;

a vertical picture size controller for receiving the second data and controlling the vertical picture size;

a frequency/voltage converter and horizontal frequency counter, coupled between the picture horizontal size controlling means and the microcomputer, for counting the horizontal frequency and converting the horizontal frequency to a corresponding voltage to produce a fourth data equal to the third data to the microcomputer.

The microcomputer includes:

a first memory for storing data representing an electric characteristic of the video appliance;

a calculator for receiving the horizontal frequency, and calculating the data stored in the first memory to produce a fifth data representing the horizontal picture size of the video appliance;

a comparator for comparing the third and fourth data with the fifth data to produce a sixth data representing the horizontal picture size adjusted by the video appliance itself;

an input controller for receiving the user's input signal and producing a seventh data representing the horizontal picture size and a control signal;

a second memory for storing the sixth data in accordance with the control signal;

a first tri-state buffer which is turned on/off in one direction in accordance with the control signal;

a second tri-state buffer which is turned on/off in both directions in accordance with the control signal;

a vertical size storing part for storing an eighth data representing the vertical picture size of the video appliance according to the vertical frequency, and for performing up/down of the stored data therein until the ratio is constant so as to produce the second data to the vertical picture size controller;

a first mixer for mixing the sixth data with the seventh data; and a second mixer, connected to the first mixer, for mixing the sixth data with the eighth data in response to "turn on" of the first and second tri-state buffers, and performing up/down of the mixed data therein until the ratio is constant to produce the first data to the horizontal picture size controller.

According to an another aspect of the present invention, there is provided a method for automatically adjusting a picture size of a video appliance having a microcomputer receiving horizontal and vertical frequencies to produce first and second data representing horizontal and vertical picture sizes, respectively, and a storing part for storing the first and second data, the method comprising the steps of:

(a) comparing a third data representing a horizontal picture size of the video appliance, which is calculated from electrical characteristic data of the video appliance stored therein, with the fourth data representing a horizontal picture size of the video appliance, which is measured by one of a deflection voltage and a frequency/voltage converter and horizontal frequency counter, and then determining whether the third data is equal to the fourth data or not;

(b) if the third data is equal to the fourth data, storing a fifth data representing a horizontal picture size adjusted by the video appliance itself, reading a sixth data representing a vertical picture size, and mixing the fifth data with the sixth data;

(c) determining a ratio of the fifth data to the sixth being constant;

(d) if the ratio is constant, storing the first data and the second data in the video appliance;

(e) if the third data is not equal to the fourth data at step (a), carrying out up/down of the first data to coincide the third data with the fourth data, and performing step (b); and (f) if the ratio is not constant at step (c), carrying out up/down of the second data to make the ratio constant, and performing step (d).

According to still another aspect of the present invention, there is provided a method for automatically adjusting a picture size of an video appliance comprising the steps of:

(a) if a user's input signal is received, stopping an automatic picture-adjusting operation of the video appliance; and (b) when the adjusting operation is stopped, mixing a first data of a horizontal picture size inputted by the user with a second data of a horizontal picture size adjusted and stored in the video appliance, producing a third data used as a horizontal picture size control signal, and performing up/down of the third data, whereby the horizontal picture size of the video appliance is automatically adjusted.

BRIEF DESCRIPTION OF THE ATTACHED DRAWINGS

The features and advantages of the present invention will become apparent through explanation of the embodiments with reference to the attached drawings.

DETAILED DESCRIPTION OF THE PREFERRED EMBODIMENTS

Figure 2:
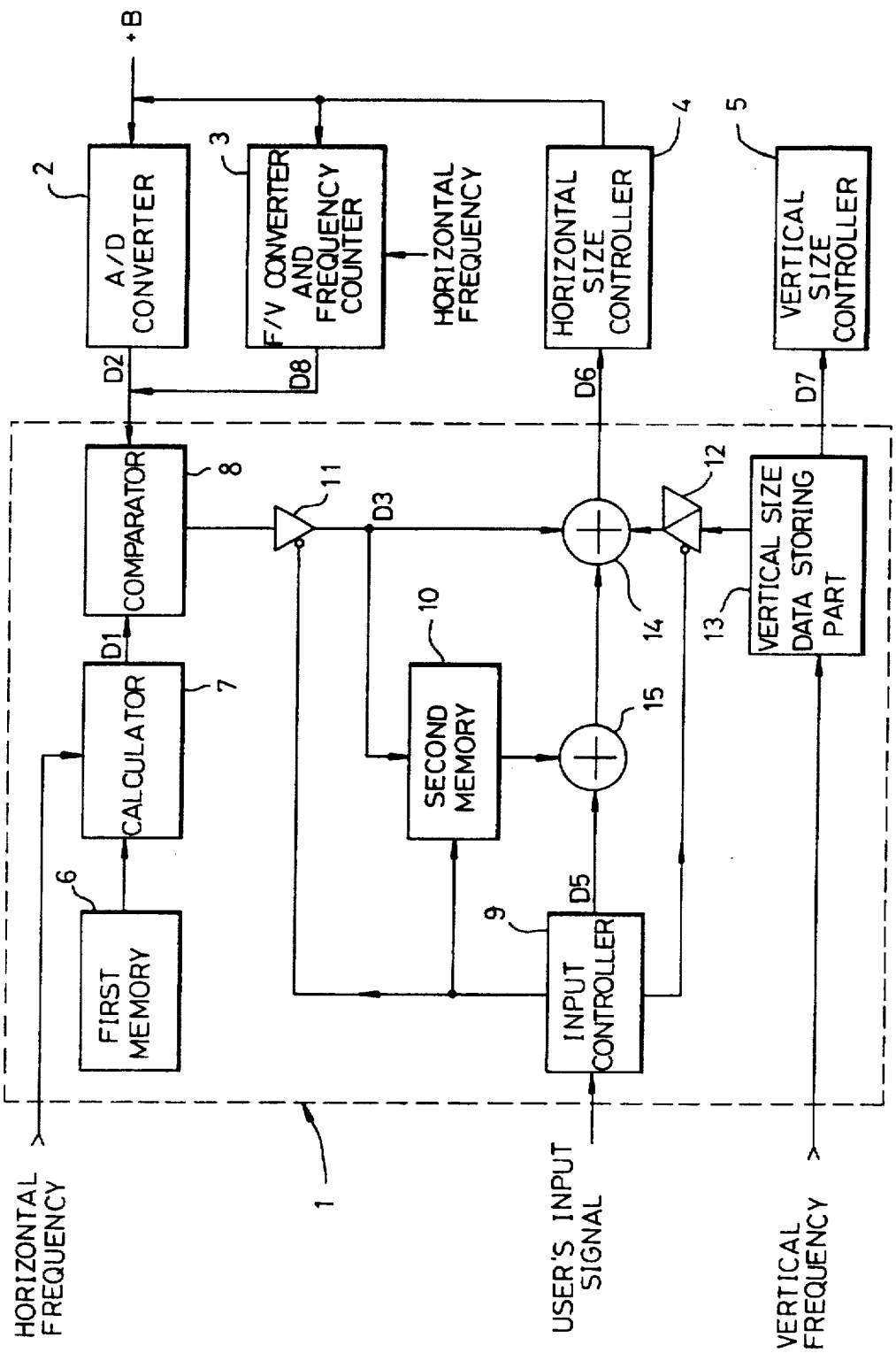
FIG. 2 is a block scheme of an apparatus for automatically adjusting picture size of a video appliance in accordance with the present invention.

FIG. 2 shows a block diagram of an apparatus for automatically adjusting a picture size of the video appliance according to the present invention.

Referring to FIG. 2, the apparatus for automatically adjusting a picture size of the video appliance includes a microcomputer 1 controlling the whole operation of the adjusting apparatus by a user's input signal and horizontal and vertical frequencies, an analog/digital (A/D) converter 2 digitizing a deflection voltage determining the horizontal picture size to provide the microcomputer 1 with data D2 of the horizontal picture size presently measured, a frequency/voltage (F/V) converter and horizontal frequency counter 3 for counting the horizontal frequency, converting the inputted horizontal frequency to a corresponding voltage level, and outputting data D8 of the presently measured horizontal frequency to the microcomputer 1, data D8 being equal to data D2, and a horizontal picture size controller 4 and a vertical picture size controller 5 for controlling the horizontal picture size and the vertical picture size under the control of the microcomputer 1, respectively.

The microcomputer 1 has a first memory part 6 in which data reflecting the electrical characteristic of the video appliance is stored, a calculator 7 for calculating data stored in the first memory part 6 to produce the calculated horizontal picture size data D1 of the video appliance, and a comparator 8 for comparing data D2 (D8) of presently measured horizontal picture size from the A/D converter 2 (the F/V converter and horizontal frequency counter 3) with data D1 from the comparator 8 to produce data D3 of the horizontal picture size adjusted by the video appliance itself.

The microcomputer further comprises an input controller 9 for generating data D5 of the horizontal picture size inputted by the user's input signal and a given control signal, a second memory part 10 for storing data D3 of the horizontal picture size outputted from the comparator 8 in response to the control signal from the input controller 9, first and second tri-state buffers 11 and 12 which are turned on/off in one direction and in both directions, respectively, under the control of the input controller 9 and a vertical picture size data storing part 13 for storing data D4 of the vertical picture size, and outputting up/down data D7 of the vertical picture size to the vertical picture size controller 5 according to the vertical frequency inputted from the exterior.

Figure 3:
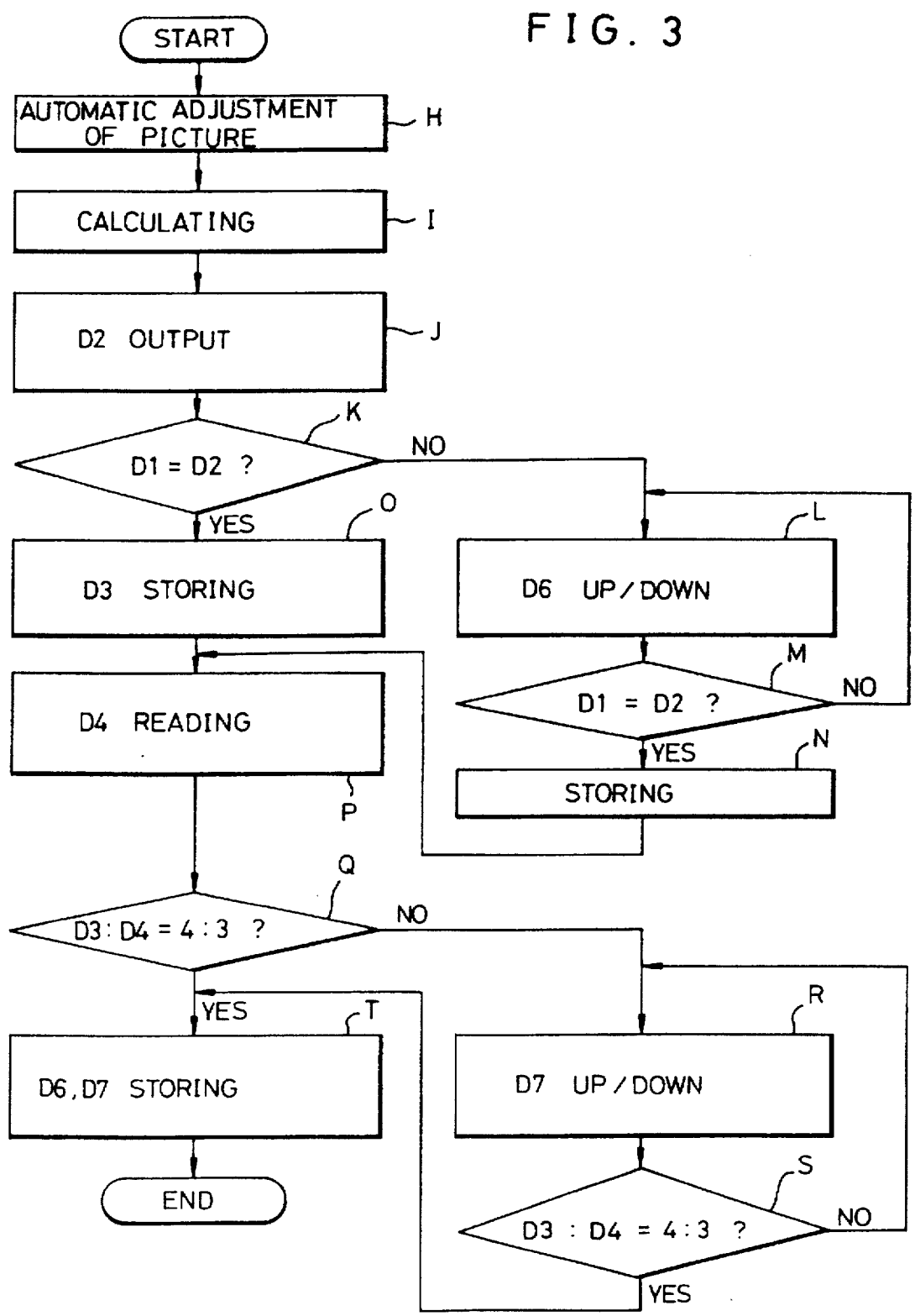
FIG. 3 is an algorithm employing a method for automatically adjusting picture size of a video appliance in accordance with the present invention.

The microcomputer still further comprises a first mixer 14 for mixing data D4 stored in the vertical picture size data storing part 13 with data D3 provided from the comparator 8 in accordance with the "turn on" of the first and second tri-state buffers 11 and 12, producing data D6 of the horizontal size which is upped/downed in order that the ratio of the horizontal picture size to the vertical picture size becomes constant, to the horizontal size controller 4 and the second mixer 15, connected to the first mixer 14, for mixing data D3 stored in the second memory part 10 with data D5 outputted from the input controller 9. FIG. 3 is an algorithm employing a method for automatically adjusting picture size of video appliance performed by the video appliance itself and by the above described apparatus according to the present invention.

With reference to FIG. 3, the method of the present invention comprises the steps of (a) comparing data D1 representing the horizontal picture size of video appliance, which is calculated from an electrical characteristic data stored in the video appliance, with data D2 representing a horizontal picture size of the video appliance, which is presently measured by a deflection voltage +B and a horizontal frequency counter and then determining whether one is equal to the other or not (steps H, I, J and K), of (b), if data D1 is not same to data D2, performing up/down of data D6 outputted from the first mixer 14 so as to control the horizontal picture size controller 4 and to coincide data D1 with data D2 (steps L, M and N) and of (c), if data D1 is equal to data D2, storing data D3 adjusted in the video appliance by itself and then reading data D4 so as to mix data D3 with data D4 at the first mixer 14 (steps O and P).

Figure 4:
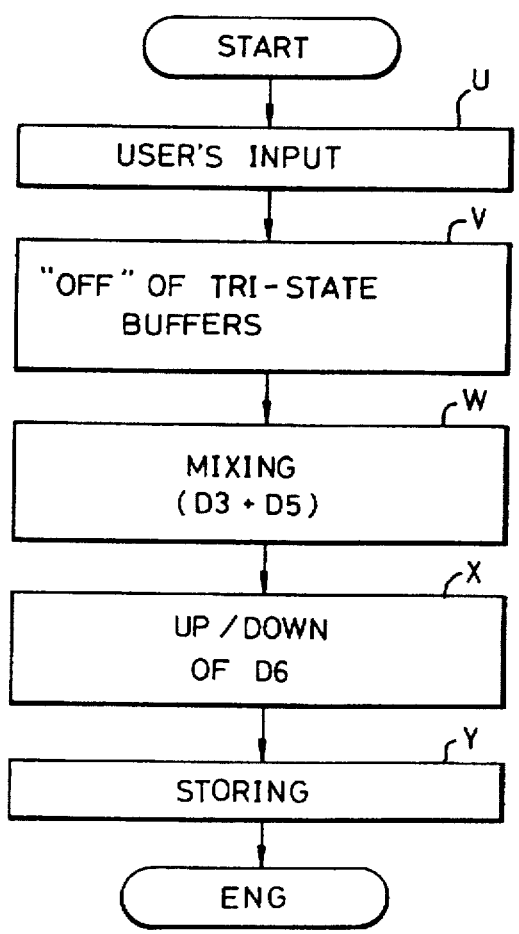
FIG. 4 is an algorithm employing a method for automatically adjusting picture size of a video appliance by a user's input signal in accordance with the present invention.
Figure 1:
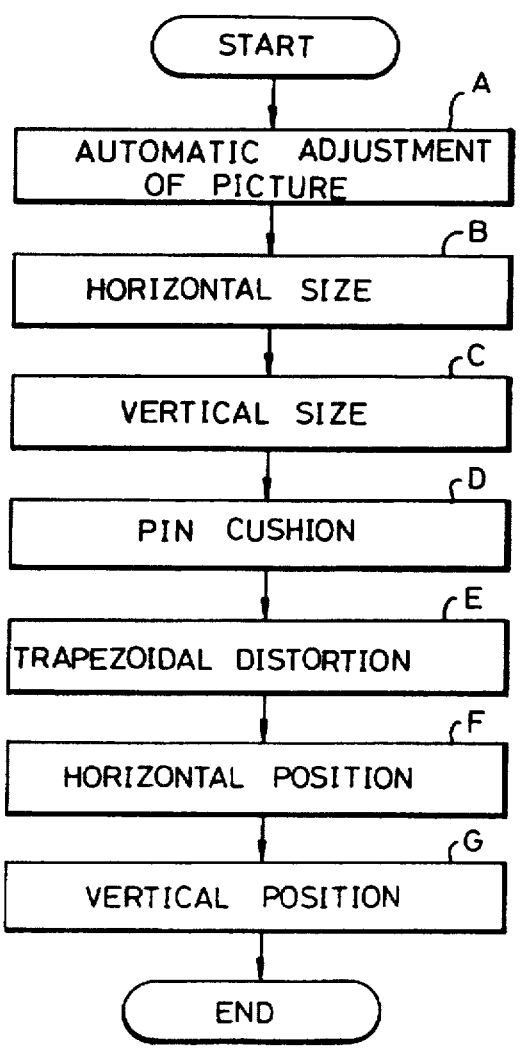
FIG. 1 is an algorithm employing a conventional method for automatically adjusting the a picture size of a video appliance.

The method according to the present invention further comprises the steps of (d) determining whether the ratio of data D3 to data D4 is constant, for example 4:3, or not (step Q), of (e), if the ratio is not constant, performing up/down of data D7 provided from the vertical picture size data storing part 13 so as to control the vertical size controller 5 and then to make the ratio of data D3 to data D4 constant (4:3) (steps R and S) and of (f), if the ratio of data D3 to data D4 is constant, storing data D6 from the first mixer 14 and data D7 from the vertical size data storing part 13 in the video appliance, whereby completing the process for automatically adjusting picture size of the video appliance (step T). FIG. 4 is an algorithm employing a method for automatically adjusting the picture size of video appliance by the user's input signal, which is performed in the video appliance and by the above described apparatus according to the present invention.

Referring to FIG. 4, the method for automatically adjusting the picture size of the video appliance comprises the steps of (a) turning off the first and second tri-state buffers 11 and 12 so as to stop the automatic picture-adjusting operation by generating a control signal at the input controller 9 in response to the user's input signal inputted from the exterior (steps U and V) and of (b) mixing data D5 of horizontal picture size inputted by the user with data D3 of horizontal picture size prestored in the second memory part 10 to produce data D6 of up/downed horizontal size to the horizontal size controller 4 so that the picture size of video appliance is automatically adjusted (steps W, X and Y).

The features of the apparatus and method in accordance with the present invention will be explained in more detail below.

First, the automatic adjustment of the vertical and horizontal picture size using the microcomputer in order to make the picture size in a normal state will be depicted referring to FIGS. 2 and 3.

The characteristic data showing the electrical features of the monitor such as a deflection current $Ih_{pp}$, an inductance Lh of the deflection yoke, a constant k determined by the horizontal frequency, and a time function ($T_s$=1/horizontal frequency—blanking interval) of the horizontal frequency, is prestored in the first memory part 6 provided within the microcomputer 1.

The characteristic data stored in the first memory part 6 is used to derive the calculated data D1 of the horizontal size which is inversely proportional to the time function of the horizontal frequency $T_s$ according to the inputted horizontal frequency at the calculator 7, and data D1 is transferred to the comparator 8. Data D1 from the calculator 7 is derived by following equation.

$$\frac{Ih_{pp} \times Lh}{T_s} \times k = D1$$

On other hand, data D2 of horizontal picture size digitized from the deflection voltage +B determining the horizontal picture size and data D8 of the horizontal picture size made by counting the horizontal frequency and converting the horizontal frequency to a corresponding voltage level, are received at the comparator 8. At the comparator 8, data D1 is compared with data D2(D8). If data D1 is equal to data D2(D8), data D3 of horizontal picture size adjusted in the monitor is stored in the second memory part 10. Then data D3 is outputted to the first mixer(14): At the first mixer(14), it is checked whether the ratio of data D3 to data D4 is constant, for example 4:3.

If ratio of data D3 to data D4 is 4:3, data D6 of horizontal picture size outputted from the first mixer 14 and data D7 of vertical picture size outputted from the vertical size storing part 13 are stored in the horizontal size controller 4 and the vertical size controller 5, respectively, and then the horizontal size controller 4 and the vertical size controller 5 normally control the horizontal and vertical picture size.

On other hand, in case that data D1 is not equal to data D2 and therefore the ratio of data D3 to data D4 is not constant (4:3), the first mixer 14 performs up/down of data D6 and outputs the up/downed data to the horizontal size controller 4.

The horizontal size controller 4 controls the A/D converter 2 and the F/V converter and horizontal frequency counter 3 in order for data D2 and D8 to be upped/downed according to data D6.

The above described operation is repeated until data D1 provided from the calculator 6 is equal to data D2 upped/downed and outputted from the A/D converter 2 and the F/V converter and horizontal frequency counter 3. When data D1 is equal to data D2 by the repeated comparison, data D3 of horizontal picture size, measured by the monitor by itself, is provided to the first mixer(14).

The ratio of data D3 to data D4 is checked as to whether it is constant (4:3) by remixing data D3 reinputted of horizontal picture size with data D4 of vertical size stored in the vertical size data storing part 13. Here, if the ratio of data D3 to data D4 is not 4:3, data D7 of vertical picture size from the vertical size storing part 13 is upped/downed until the ratio reaches 4:3 and then the result thereof is transferred to the vertical size controller 5. Therefore, the vertical size controller 5 makes the picture size of video appliance in a normal state.

The automatic adjustment of the horizontal picture size of the video appliance in accordance with the user's input signal will be explained with reference to FIGS. 2 and 4.

If data D5 of horizontal picture size is received at the input controller 9 installed in the microcomputer 1, the input controller 9 outputs data D5 of the horizontal picture size to the second mixer 15 and turns off the first and second tri-state buffers 11 and 12, stopping the automatic picture-adjusting operation described above. Also, the second memory part 10 generates data D3 of horizontal size stored therein to the second mixer 15 according to the control signal provided from the input controller 9 and the second mixer 15 mixes data D5 with data D3. The mixed data D3+D5 is transferred to the first mixer 14. Then, the first mixer 14 outputs data D6 of the horizontal picture size to the horizontal size controller 4 with performing up/down of data D6 in accordance with mixed data D3+D5, controlling the horizontal picture size controller 4. Thereby the horizontal picture size of video appliance can be made in a normal state by the horizontal size controller 4.

As described above, since electrical characteristic data of video appliance employing the apparatus of the present invention is preset in the microcomputer, regardless of entrance of any external data, a user's one time input or automatic picture-adjusting mode selection makes the external input data and the preset characteristic data be compared, and the horizontal and vertical picture size of video appliance is automatically adjusted to display a picture always in uniform size. Accordingly, the adjusting step is simplified in the manufacturing process of monitor, promoting productivity, and decreasing the cost of the video appliance.

What is claimed is:

1. An apparatus for automatically adjusting a picture size of an video appliance comprising:
   a microcomputer receiving a user's input signal and a horizontal frequency and a vertical frequency to output a first data and a second data representing a horizontal picture size and a vertical picture size, respectively, a ratio of said first data to said second data being constant;

an analog/digital converter for digitizing a deflection voltage determining a horizontal picture size and outputting a third data representing a measured horizontal picture size to said microcomputer;

means for controlling the horizontal picture size, coupled between said microcomputer and said analog/digital converter, and receiving said first data;

means for controlling said vertical picture size, and receiving said second data; and means for counting said horizontal frequency and converting said horizontal frequency to a corresponding voltage to produce a fourth data equal to said third data to said microcomputer, said counting means being coupled between the picture horizontal size controlling means and said microcomputer.

2. An apparatus according to claim 1, wherein said microcomputer comprises:

first memory means for storing data representing an electric characteristic of said video appliance;

means for calculating said data stored in said first memory means to produce a fifth data representing a horizontal picture size of said video appliance, and receiving said horizontal frequency from an exterior;

means for comparing said third and fourth data with said fifth data to produce a sixth data representing a horizontal picture size adjusted by said video appliance itself;

means for producing a seventh data representing a horizontal picture size and a control signal, and receiving said user's input signal;

second memory means for storing said sixth data under said control signal;

first tri-state buffing means which is turned on/off in one direction in accordance with said control signal;

second tri-state buffing means which is turned on/off in both directions in accordance with said control signal;

means for storing an eighth data representing a vertical picture size of said video appliance according to said vertical frequency and for performing up/down of the stored data therein until said ratio is constant, and producing said second data to said vertical picture size controlling means;

first mixing means for mixing said sixth data with said seventh data; and second mixing means, connected to said first mixing means, for mixing said sixth data with said eighth data in response to "turn on" of said first and second tri-state buffing means, and for performing up/down of the mixed data therein until said ratio is constant, and producing said first data to said horizontal picture size controlling means.

3. An apparatus according to claim 2, wherein said fifth data is calculated by following equation:

$$\frac{Ih_{pp} \times Lh}{T_s} \times k = D1$$

where $Ih_{pp}$ is a deflection current of said video appliance, $Lh$ is deflection yoke inductance of said video appliance, $k$ is a constant determined by said horizontal frequency, $D1$ is said fifth data of a horizontal picture size, and $T_s$ is a time function of said horizontal frequency having a relation of $T_s$=(1/horizontal frequency)-blanking interval.

4. A method for automatically adjusting a picture size of a video appliance having a microcomputer receiving horizontal and vertical frequencies, for producing first and second data representing horizontal and vertical picture sizes, respectively, and storing means for storing said first and second data, the method comprising the steps of:

(a) comparing a third data representing a horizontal picture size of said video appliance which is calculated from an electrical characteristic data of said video appliance stored therein with a fourth data representing a horizontal picture size of said video appliance measured by one of a deflection voltage and a frequency/voltage converter and horizontal frequency counter, and then deciding whether said third data is equal to said fourth data or not;

(b) if said third data is equal to said fourth data, storing a fifth data representing a horizontal picture size adjusted by said video appliance itself, then reading a sixth data representing a vertical picture size, and mixing said fifth data with said sixth data;

(c) determining whether a ratio of said fifth data to said sixth data being constant;

(d) if said ratio is constant, storing said first data and said second data in said video appliance;

(e) if said third data is not equal to said fourth data at step (a), carrying out up/down of said first data to coincide said third data with said fourth data, and performing step (b); and (f) if said ratio is not constant at step (c), carrying out up/down of said second data to make said ratio constant, and performing step (d).

5. A method for automatically adjusting a picture size of an video appliance comprising the steps of:

(a) if a user's input signal is received, stopping an automatic picture-adjusting operation of said video appliance; and (b) when said adjusting operation is stopped, mixing a first data of a horizontal picture size inputted by the user with a second data of a horizontal picture size adjusted and stored in said video appliance, producing a third data used as a horizontal picture size control signal, and performing up/down of said third data, whereby the horizontal picture size of said video appliance is automatically adjusted.

* * * * *

UNITED STATES PATENT AND TRADEMARK OFFICE
CERTIFICATE OF CORRECTION

PATENT NO. : 5,764,302
DATED : June 9, 1998
INVENTOR(S) : Kwang Ho PARK

It is certified that error appears in the above-identified patent and that said Letters Patent is hereby corrected as shown below:

The named Assignee is changed to --LG Electronics, Seoul, Rep. of Korea--

Signed and Sealed this

Fifteenth Day of May, 2001

Attest:

NICHOLAS P. GODICI

*Attesting Officer*          *Acting Director of the United States Patent and Trademark Office*